United States Patent [19]

Joyce

[11] Patent Number: 6,000,543
[45] Date of Patent: Dec. 14, 1999

[54] VIDEOCASSETTE PACKAGE

[76] Inventor: Michael P. Joyce, 801 W. Shore Dr., Kinnelon, N.J. 07405

[21] Appl. No.: 09/088,241

[22] Filed: Jun. 1, 1998

[51] Int. Cl.$^6$ .................................................. B65D 85/672
[52] U.S. Cl. ...................................... 206/387.13; 206/472
[58] Field of Search ........................... 206/387.1, 387.13, 206/472

[56] References Cited

U.S. PATENT DOCUMENTS

| | | | |
|---|---|---|---|
| 3,743,081 | 7/1973 | Roberg et al. ...................... | 206/387.13 |
| 4,593,814 | 6/1986 | Hagiwara et al. .................. | 206/387.13 |
| 5,145,068 | 9/1992 | Schmitz et al. ..................... | 206/387.13 |

*Primary Examiner*—Jacob K. Ackun
*Attorney, Agent, or Firm*—Kaplan & Gilman, LLP

[57] ABSTRACT

A videocassette package is disclosed which may be injection molded from plastic. The package includes sloped and vertical walls to assist in guiding the videocassette to be inserted into the proper position.

22 Claims, 3 Drawing Sheets

VIDEOCASSETTE PACKAGE

TECHNICAL FIELD

This invention relates to packages for videocassettes, and more particularly, to an improved videocassette package which is easy to manufacture and which assists greatly in the loading and unloading of videocassettes into and out of the package. The invention is of particular benefit when the loading operation is done automatically along an assembly line.

BACKGROUND OF THE INVENTION

Videocassette packages are typically made from plastic or thermal formed material. The package usually contains an inner chamber for holding the videocassette, and outer label for identifying the videotape contained therein. The outer label is usually applied by first attaching a graphic wrap material to the package, and then placing a sheet of graphic material between the package and the graphic wrap.

One problem associated with prior art videocassette packages is that they are difficult to automatically load. Specifically, as a videocassette is placed into the videocassette package by an automatic loading means, it must be in exactly the right position to fall into the chamber created on the inside thereof for holding the videocassette. If the videocassette is loaded slightly off-center, it will not enter the package. Rather, the videocassette gets stuck hanging on the package, partially inserted. On an automatic assembly line, this becomes a significant problem and results in lost time and money.

An additional problem is that numerous manufacturing steps are required to form the package. For example, a thermal formed package may require the addition of numerous layers in order to form the outside of the videocassette package.

In view of the foregoing, there exists a need in the art for an improved videocassette package which is both easy to manufacture, and which may be loaded and unloaded efficiently and easily. More specifically, there exists a need in the art which will allow for the automatic loading and unloading of videocassette packages with videocassettes. Additionally, it is desirable to form the packages as quickly and inexpensively as possible.

SUMMARY OF THE INVENTION

The above and other problems of the prior art are overcome in accordance with the present invention which relates to an improved videocassette package which may be molded in a single step. In accordance with the invention, a videocassette package includes a top and bottom, with each comprising an inner wall and an outer wall. The inner wall forms a chamber for holding the videocassette and is preferably sloped to guide the videocassette into place during insertion. Additionally, the non-sloped portion holds the videocassette firmly in place.

The package conveniently may be formed from one molding step, the walls and surfaces all being integral with one another. This forming step eliminates the need for extra layers and minimizes cost.

The height of the inner wall is selected such that the videocassette may also be easily removed from the package thereof. Specifically, the height is selected so that it is significantly shorter than the videocassette, and thus leaves a relatively large portion of the videocassette walls exposed when the package is opened. The user may therefore easily and conveniently grip the sides of the videocassette for removal.

DETAILED DESCRIPTION OF THE PREFERRED EMBODIMENT

Figure 1:
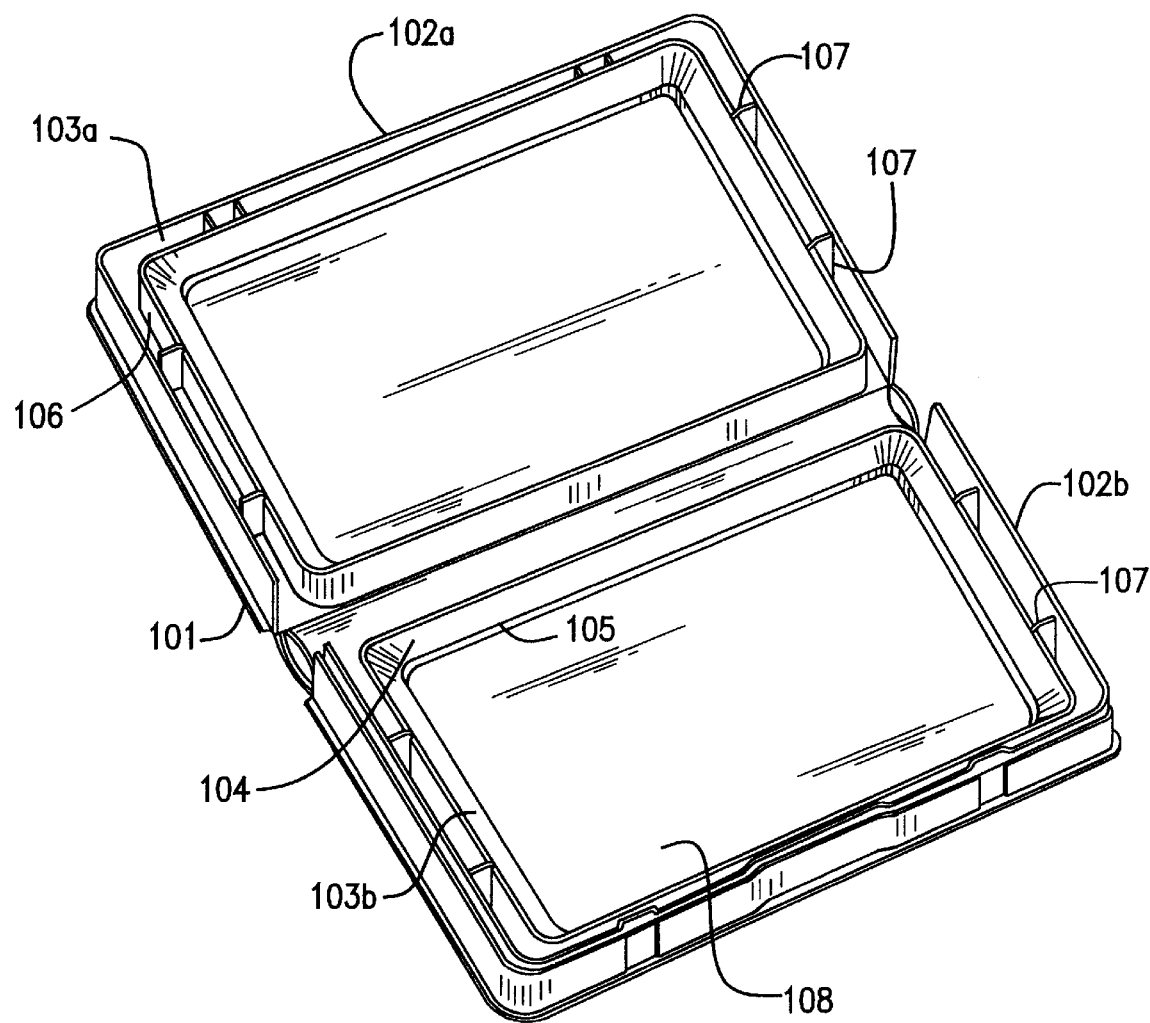
FIG. 1 inventive videocassette package when in the open state.

FIG. 1 shows a perspective view of the inventive videocassette package when in the open state. The arrangement of FIG. 1 includes a videocassette package 101 which comprises an outer wall 102 and an inner wall 103. In the present example, the inner wall 103 is a double wall as shown. The double wall 103 includes a sloped portion 104 and a vertical portion 105. The double wall also includes perimeter portion 106 disposed vertically with respect to the surface of the package.

A plurality of fins 107 are installed between the perimeter portion 106 and the outer wall 102 as shown. Other than these fins, the inner and outer wall, do not touch, and in fact, are separate from each other as shown. This structure helps isolate the videocassette from shock caused by handling and dropping.

The package is preferably injection molded using conventional techniques from plastic such as polypropelene. Since the injection molded package comprises only one part, the entire construction can be done in one single step, with the label being placed on the outside of the case in a second step as described hereafter.

The construction of the videocassette package provides for ease of loading, and specifically, assists in arrangements whereby multiple packages are automatically loaded via an assembly line and automatic loading equipment. Specifically, the sloped portion 104 of inner wall 103 serves as a guide, so that the videocassette may be dropped in with very little precision, and will slide toward the bottom of the sloped portion 104. Additionally, the vertical portion 105 of double wall 103 holds the videocassette in place after it has fallen to the bottom of cassette compartment 108, as more fully shown with respect to the later figures.

The fins 107 prevent the outer wall 102 from becoming too flimsy and/or bending during handling and operation. Thus, the required stiffness of the outer wall is maintained, and the inner wall is much sturdier due to its double wall construction as shown. Of course, the inner wall need not necessarily be a double wall construction.

Figure 2:
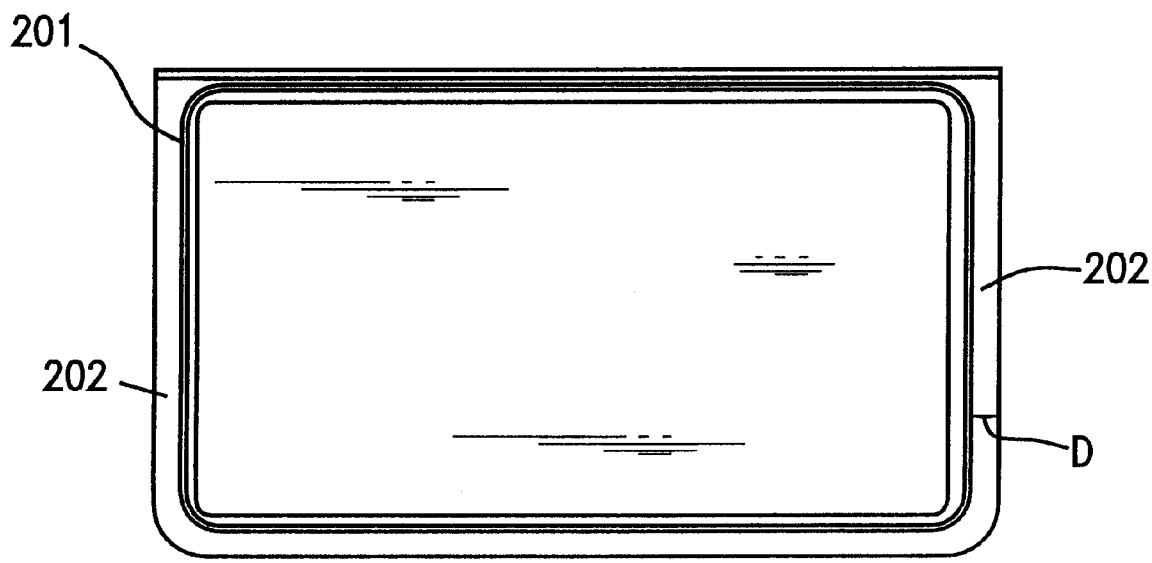
FIG. 2 shows top view of the videocassette package of the present invention when closed.

Since the package is preferably injection molded in a single step, the double inner wall 103 creates a channel which can be seen from the outside of the case as best shown in FIG. 2. The channel 201 represents the negative impression of the double wall shown in FIG. 1. However, since the videocassette package will be covered with the sheet of graphics, and since the graphics are typically opaque, the channel 201 will normally not be viewable by a user, and thus will not result in any degrading of the appearance of the videocassette package.

The area 202 between the channel 201 and outer perimeter of the package serves additional functions. First, this additional area makes the package larger than the videocassette, thereby allowing more room for advertising, graphics, etc. Second, the package is labeled by first covering it with a graphic wrap and then inserting the desired labeling or sheet of graphic material between the package and the graphic wrap. The area 202 provides a surface so that the edges of the sheet of graphic material do not bend into channel 201. Preferably, the distance D from the channel to the perimeter of the package should be approximately ¼ inch.

A closer examination of FIGS. 1 and 2 reveals that the videocassette, when installed in the package, will be maintained within the confines of vertical portion 105 of double wall 103. There is then a border 202 around the videocassette when it is installed within the videocassette package 101. The combination of a sloped portion 104 and a vertical portion 105 serves to guide the videocassette into place and then hold it from sliding around.

Figure 3:
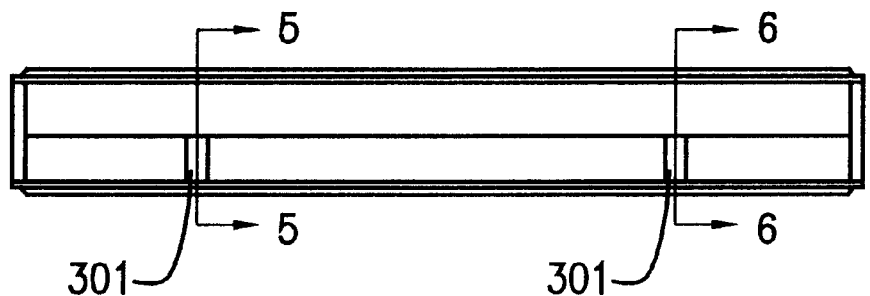
FIG. 3 shows a front view of a close d videocassette package of the present invention.

FIG. 3 shows a front view of the closed videocassette package including the small notches 301 which serve to maintain the videocassette package in the closed state. The operation of the notches will be further described later herein.

Figure 4:
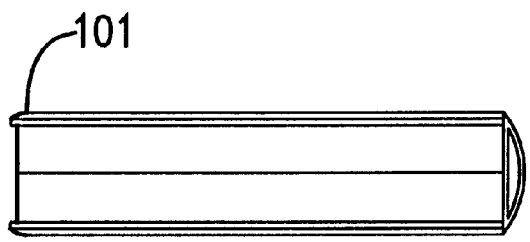
FIG. 4 shows a side view of a closed videocassette package of the present invention.

FIG. 4 shows a side view of the inventive videocassette package 101. The width across FIG. 4 is significantly wider than the width of a videocassette to be installed within said package, since the double wall 103 is separated from the outer perimeter of the videocassette package as previously shown.

Figure 5:
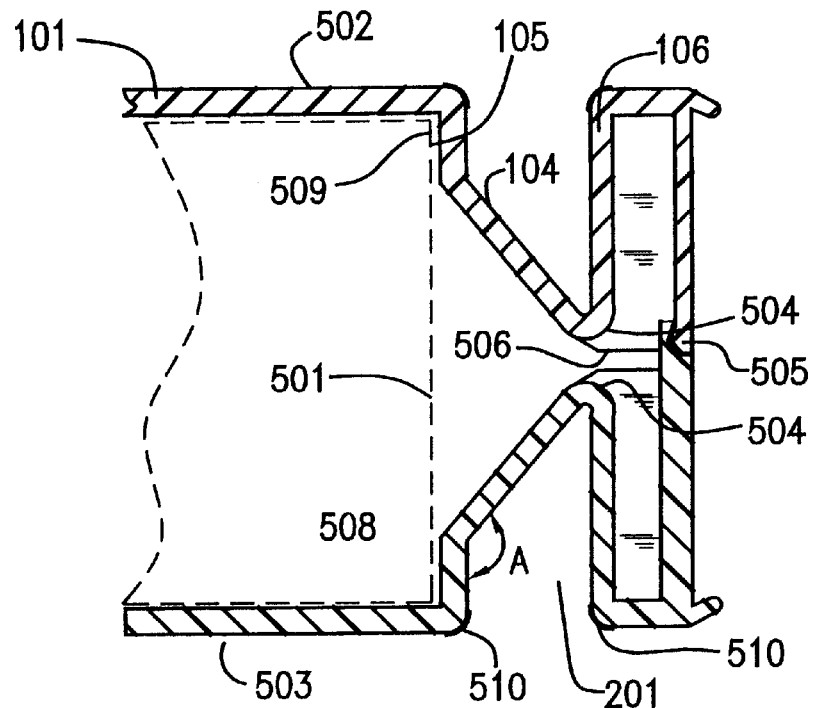
FIG. 5 shows across section view of the present invention.

Turning to FIG. 5, FIG. 5 shows a cross sectional view through the plane indicated in FIG. 3 of the videocassette package 101 when in the closed state. FIG. 5 shows in dotted outline a videocassette 501 installed within the videocassette package 101. The videocassette is contained vertically between the top and bottom 502 and 503 respectively of the videocassette package. The videocassette is contained horizontally between the vertical portions 105 of double wall 103. The vertical portions 105 should be approximately ³⁄₁₆ of an inch, or 0.175 inches for ideal storage and removal of the videocassette cartridge.

As also appreciated from FIG. 5, the double wall 103 includes a curved region 504 which interconnects the sloped portion 104 and the perimeter portion 106 of the double wall 103. Additionally, the edges 510 of channel 201 are not sharp, so that the packaging label does not get stuck thereon.

FIG. 5 also shows the preferred angle A between the sloped and vertical portions of the double wall. In practice, A should be chosen to be approximately 150° for best results.

It can be seen that there is a slight lip 505 which mates with a flange 506 to maintain the videocassette package in the closed position. As can be appreciated from FIGS. 1 and 3, there are two portions along the front of the videocassette package 101 which includes these lips and flanges, whereas the remaining portion along the front of the videocassette package 101 does not include this lip and flange arrangement.

Figure 6:
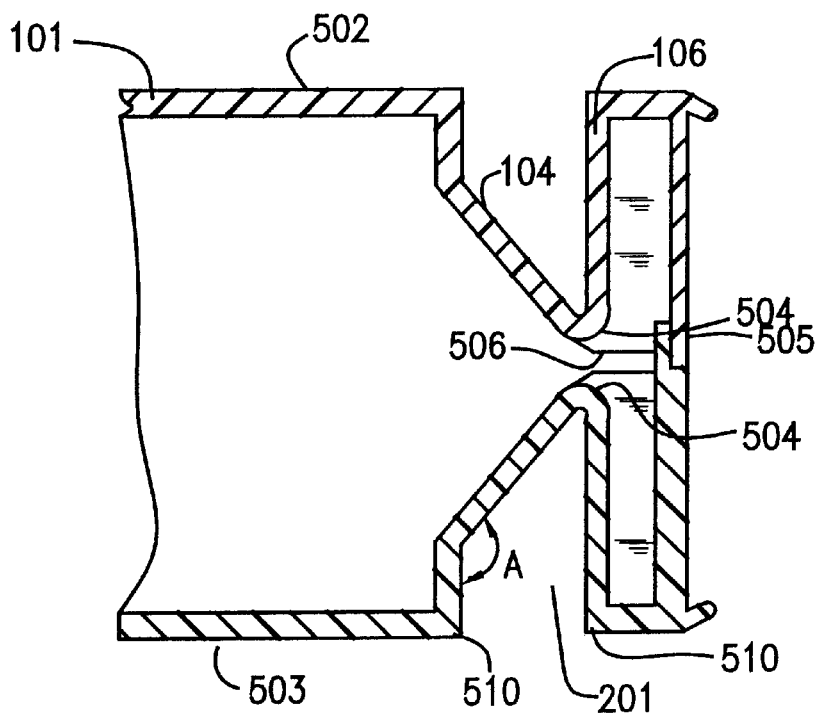
FIG. 6 shows an additional cross-section al view of the present invention.

FIG. 6 shows a cross section through a different portion of the videocassette package which does not include the tongue and flange.

It can also be appreciated from FIGS. 5 and 6 that when the videocassette package is in the closed position the curved portions 504 do not touch. Accordingly, the height of the videocassette is greater than the combined height of perimeter portion 106.

Additionally, due to the fact that the vertical portion 105 is significantly shorter than the videocassette, when the videocassette package 101 is opened, the user may easily remove the cassette package because only the portion of the videocassette 501 which is below the height of vertical portion 105 will not be exposed for easy handling. Specifically, when the videocassette package is opened, the entire portion between 508 and 509 will be exposed for the user to grasp.

While the above describes the preferred embodiment of the present invention, various other modifications will be apparent to those of ordinary skill in the art. The variations are intended to be covered by the following claims.

What is claimed is:

1. A videocassette package comprising: first and second covers, at least one of which covers has a first structural arrangement that includes:
   a side wall depending from a first surface thereof;
   a cassette-receiving enclosure defined on said first surface within a perimeter that is at least partially defined by said side wall,
   said cassette-receiving enclosure defined by an inner wall having:
      a first region rising orthogonally from said first surface; and
      a second region rising obliquely from said first region towards said side wall.

2. The package of claim 1, wherein both said first cover and said second cover have said first structural arrangement.

3. The package of claim 1, wherein said inner wall is a double wall having spaced apart first and second surfaces, wherein:
   said second surface is proximal to said perimeter and said first surface is distal to said perimeter;
   and said first surface comprises said first and second regions.

4. The package of claim 3, further comprising a support for stiffening said side wall.

5. The package of claim 4, wherein said support comprises a plurality of fins, a first end of each of said fins abutting said side wall and a second end of each of said fins abutting said second surface of said inner wall.

6. The package of claim 1, wherein said side wall of said first and second covers are physically adapted to releaseably engage one another.

7. The package of claim 6, wherein the physical adaptation is a flange that receives a lip, wherein said side wall of said first cover includes said flange and said side wall of said second cover includes said lip.

8. The package of claim 1, wherein said first and second covers depend from opposite edges of a spine, said first and second covers being rotatable about said edges into opposed relation with one another.

9. The package of claim 2, wherein said first region of the inner wall has a height of 0.175 inches.

10. The package of claim 2, wherein said first and second regions of the inner wall define an included angle of 150°.

11. A package comprising:
   a first cover and a second cover,
   said first and second covers connected to opposite edges of a spine and rotatable about said edges into opposed relation with one another, wherein, when in said opposed relation:
      first planar surfaces of each of said first and second covers define interior surfaces, said first planar surfaces each including:

a chamber defined by a first wall depending from said first planar surface, said first wall comprising:
a first region that rises orthogonally from said first planar surface; and a second region that rises obliquely from said first region resulting in an inclined surface operable to direct an article received thereon towards said first region within said chamber.

12. The package of claim 11, further comprising a first side wall depending from said first cover and a second side wall depending from said second cover, wherein:
the chamber on the first planar surface of said first cover is disposed within a first perimeter that is defined, at least in part, by said first side wall; and
the chamber on the first planar surface of said second cover is disposed within a second perimeter that is defined, at least in part, by said second side wall.

13. The package of claim 12, wherein said first and second side walls are physically adapted to releaseably engage one another.

14. The package of claim 13, wherein the physical adaptation is a flange that receives a lip, wherein said first side wall includes said flange and said second side wall includes said lip.

15. The package of claim 12, wherein said first wall is a double wall having spaced-apart first and second surfaces, wherein:
said second surface is proximal to said side wall and said first surface is distal to said side wall;
and said first surface comprises said first and second regions.

16. The package of claim 15, further comprising a support for stiffening said side walls.

17. The package of claim 16, wherein said support comprises a plurality of fins, a first end of each of said fins abutting said side walls and a second end of each of said fins abutting said second surface of said first wall.

18. The package of claim 11, wherein said first region of the first wall has a height of 0.175 inches.

19. The package of claim 11, wherein said first and second regions of the first wall define an included angle of 150°.

20. A method for making a package, comprising:
forming a first wall normal to a first planar surface, said first wall defining a perimeter;
forming a second wall that defines a chamber within said perimeter, including:
forming a lower region that is proximal to said first planar surface; and
forming an upper region that depends from said lower region and is distal to said first planar surface;
wherein,
said lower region is formed normal to said first planar surface, and said upper region is formed such that it tilts away from the normal towards said first wall, such that an included angle formed between said upper and lower regions is less than 180°.

21. The method of claim 20, wherein forming a second wall comprises:
forming a double wall having spaced-apart first and second surfaces,
said first surface comprising said lower and upper regions; and wherein
said second surface is disposed proximal to said first wall and said first surface is disposed distal to said first wall.

22. The method of claim 21, further comprising:
forming a plurality of fins, a first end of each of said fins abutting said first wall, and
a second end of each of said fins abutting said second surface of second wall.

* * * * *